(12) United States Patent
Maichl et al.

(10) Patent No.: US 8,905,067 B2
(45) Date of Patent: Dec. 9, 2014

(54) VALVE MODULE

(75) Inventors: Martin Maichl, Salach (DE); Hannes Wirtl, Schongau (DE); Andreas Dickhoff, Kirchheim/Teck (DE)

(73) Assignee: Festo AG & Co. KG, Esslingen (DE)

( * ) Notice: Subject to any disclaimer, the term of this patent is extended or adjusted under 35 U.S.C. 154(b) by 0 days.

(21) Appl. No.: 14/114,045

(22) PCT Filed: Jul. 19, 2012

(86) PCT No.: PCT/EP2012/003051
§ 371 (c)(1),
(2), (4) Date: Oct. 25, 2013

(87) PCT Pub. No.: WO2013/013796
PCT Pub. Date: Jan. 31, 2013

(65) Prior Publication Data
US 2014/0174564 A1    Jun. 26, 2014

(30) Foreign Application Priority Data

Jul. 22, 2011 (DE) .......................... 10 2011 108 179

(51) Int. Cl.
*F16K 37/00* (2006.01)
*F16K 31/122* (2006.01)
*F16K 31/124* (2006.01)

(52) U.S. Cl.
CPC ......... *F16K 31/1221* (2013.01); *F16K 37/0025* (2013.01); *F16K 31/124* (2013.01)
USPC ............ 137/554; 251/63; 251/63.5; 251/61.3

(58) Field of Classification Search
CPC .................................................. F16K 31/385
USPC ..................... 137/554; 251/61, 61.3, 63, 63.5
See application file for complete search history.

(56) References Cited

U.S. PATENT DOCUMENTS

| | | | | |
|---|---|---|---|---|
| 1,939,150 A | * | 12/1933 | Terry | 251/61.3 |
| 3,470,910 A | * | 10/1969 | Loveless | 137/625.6 |
| 3,670,771 A | * | 6/1972 | Dewberry | 137/625.6 |
| 5,669,413 A | * | 9/1997 | Hegglin et al. | 137/554 |

FOREIGN PATENT DOCUMENTS

| | | |
|---|---|---|
| DE | 19724076 | 12/1998 |
| DE | 10359673 | 8/2005 |
| DE | 10304608 | 5/2007 |
| EP | 2237128 | 10/2010 |
| GB | 1525364 | 9/1978 |
| WO | WO2005036039 | 4/2005 |
| WO | WO2007118674 | 10/2007 |

* cited by examiner

*Primary Examiner* — Craig Schneider
*Assistant Examiner* — Angelisa Hicks
(74) *Attorney, Agent, or Firm* — Hoffmann & Baron, LLP

(57) ABSTRACT

Valve module for influencing a fluid supply of a fluid-operated load, comprising a valve housing with a valve chamber being connected to an inlet port and an outlet port and a pilot chamber being connected to an operating port, comprising a valve member which is movably adjustable between a blocking position and a release position and further comprising an actuator which is motion-coupled to the valve member, wherein a position of the actuator and the valve member can be set as a function of a pressure applied to the pilot chamber, and further comprising a sensor device for detecting a position of the valve member and/or the actuator along a movement axis, and the sensor device comprises an electric coil arrangement which forms a ring around at least one fluid port from the group comprising the operating port, the inlet port and the outlet port.

9 Claims, 2 Drawing Sheets

VALVE MODULE

This application claims priority based on an International Application filed under the Patent Cooperation Treaty, PCT/EP2012/003051, filed Jul. 19, 2012, which claims priority to DE102011108179.1, filed Jul. 22, 2011.

BACKGROUND OF THE INVENTION

The invention relates to a valve module for influencing a fluid supply of a fluid-operated load, comprising a valve housing which defines a valve chamber with a fluidically communicating connection to an inlet port and an outlet port and a pilot chamber with a fluidically communicating connection to an operating port, and further comprising a valve member which is movably accommodated in the valve chamber and which is adjustable between a blocking position and a release position in order to influence a free flow cross-section between the inlet port and the outlet port, and further comprising an actuator which is movably accommodated in the pilot chamber and motion-coupled to the valve member, so that a position of the actuator and the valve member coupled thereto can be set as a function of a pressure applied to the pilot chamber, and further comprising a sensor device for detecting a position of the valve member and/or the actuator along a movement axis.

From WO 2007/118674 A2, a valve device is known wherein a position of an armature or a valve piston is detected by means of a stroke sensor. The stroke sensor may be a non-contacting inductive sensor which is placed outside an armature chamber.

SUMMARY OF THE INVENTION

The invention is posed on the problem of providing a valve device having a compact structure.

This problem is solved by a valve device of the type referred to above with the features of claim 1.

According to the invention, it is provided that the sensor device comprises an electric coil arrangement which forms a ring around at least one fluid port from the group comprising the operating port, the inlet port and the outlet port. The coil arrangement may be by way of example a flat coil on a printed circuit board, or else a wound wire coil. In the flat coil, the windings are arranged helically, perhaps in several printed circuit board planes arranged parallel to one another. The windings of the wire coil are preferably produced from insulated wire and wound onto a winding core. The winding core is preferably tubular and serves as connector for one fluid port from the group comprising the operating port, the inlet port and the outlet port. This allows for a compact design of the sensor device and furthermore ensures that the coil arrangement can be placed as close as possible to the actuator and/or the valve member, so that the mutual influence of the magnetic field emitted by the coil is maximised by the relative movement between the coil arrangement and the actuator/valve member; as a result, a small coil and/or a low energy flow through the coil is/are sufficient.

Advantageous further developments of the invention are specified in the dependent claims.

It is expedient if a winding axis of the coil arrangement and the movement axis of the valve member and/or of the actuator are oriented at least substantially parallel to and in particular concentric with one another. The actuator and, if applicable, the valve member are preferably designed for a linear movement along the movement axis. If the winding axis of the coil arrangement, i.e. the axis which forms an axis of symmetry for all or a majority of the windings of the coil arrangement, is oriented parallel to the movement axis, a proportional relationship is at least in some respects ensured between the change of the distance between the valve member/actuator and the coil arrangement and the change of the magnetic field of the coil arrangement and the electric characteristics related thereto, in particular the coil current.

In a further development of the invention, it is provided that a winding axis of the coil arrangement and an extension axis of the fluid port are oriented at least substantially parallel to and in particular concentric with one another. This allows for a particularly compact design of the coil arrangement and the fluid port.

It is advantageous if the valve member and/or the actuator comprise(s) at least one electrically conducting region. This results in a reliable, distance-dependent influence of the valve member and/or the actuator on the magnetic field of the coil arrangement.

The sensor device preferably comprises an AC source for the provision of a high-frequency AC voltage for the coil arrangement and an impedance measuring device for determining the impedance of the coil arrangement. If provided with the high-frequency AC current, the coil arrangement emits a magnetic AC field which interacts with the valve member and/or the actuator, because an eddy current is induced in the valve member and/or the actuator. The induced eddy current changes the AC resistance of the coil. i.e. its impedance. By altering the relative position of the valve member and/or the actuator in respect to the coil arrangement, the magnetic field strength acting on the valve member and/or the actuator is changed as well, so that the impedance of the coil arrangement to which the current is applied changes likewise. This change is determined by an impedance measuring device, which in the illustrated embodiment may be a current meter for determining the coil current flowing through the coil arrangement.

In a further variant of the invention, it is provided that the coil arrangement is located on an end part which, together with the valve housing, bounds the pilot chamber and which comprises a fluid passage which is designed as an operating port for a fluidic supply of the pilot chamber. The end part therefore has several functions, in particular the end-side fluidic bounding of the pilot chamber, the provision of the fluid passage between the operating port and the pilot chamber and the provision of a mechanical support for the coil arrangement in the manner of a winding core.

It is expedient if a sealing membrane accommodated in the pilot chamber and reliably separating the fluid flow through the valve chamber from the fluid flow into the pilot chamber is located between the end part and the actuator. This provides an additional fluidic isolation between the pressurised fluid provided for the control of the valve member, which flows into the pilot chamber, and the fluid flow to be controlled by the valve means. This is particularly advantageous in applications in which a contact between the operating fluid in the pilot chamber and the fluid flow through the valve chamber is to be avoided, for example in the case of fluids to be used as foodstuffs or as a base material for foodstuffs.

BRIEF DESCRIPTION OF THE DRAWINGS

An advantageous embodiment of the invention is shown in the drawing, of which.

DETAILED DESCRIPTION OF THE PREFERRED EMBODIMENTS

Figure 1:
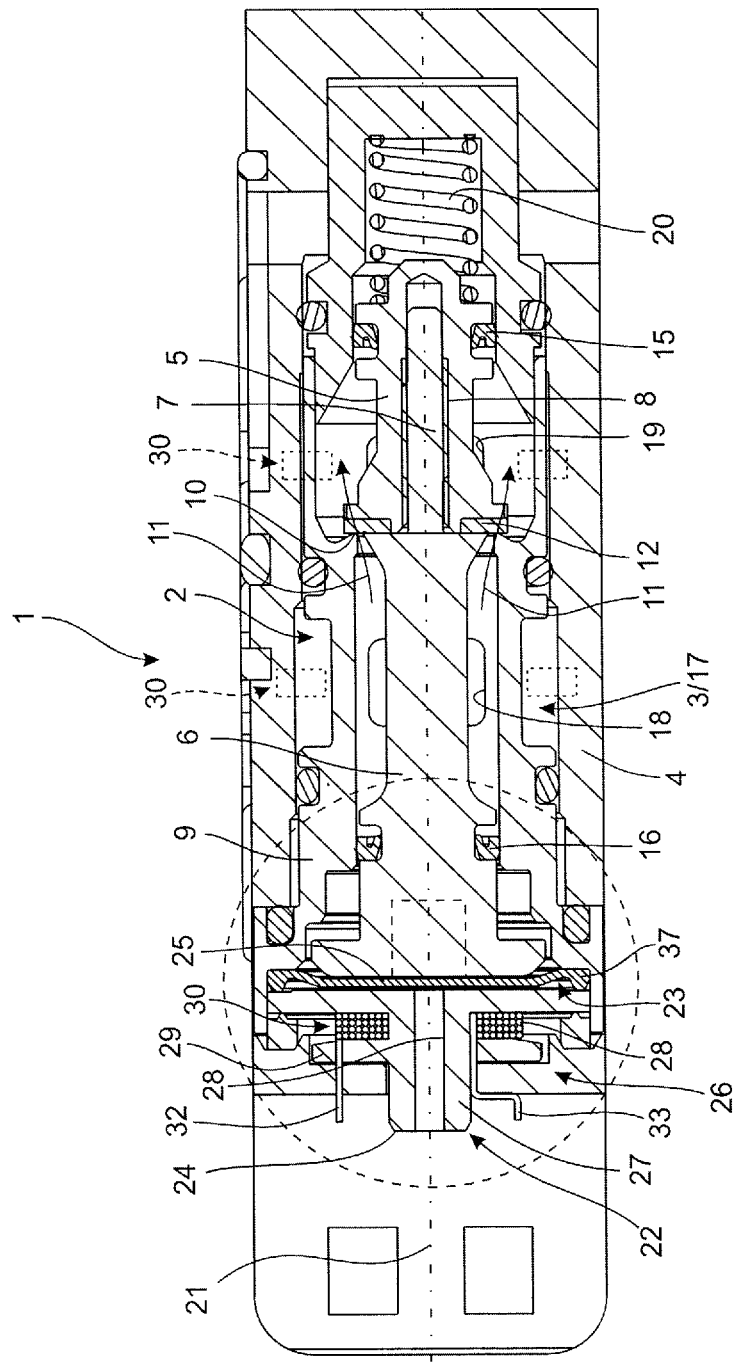
FIG. 1 is a sectional view of a valve module comprising a sensor device.

A sectional view of a valve module 1 according to FIG. 1 shows a valve body 2, which is designed in two parts in the illustrated embodiment and which is slidably accommodated in a valve recess 3 of a valve housing 4. The valve body 2 comprises a valve member 5 and an actuator 6, which are permanently joined to one another. For this purpose, a threaded section 7 is formed on the actuator 6 and a corresponding threaded blind hole 8 is formed in the valve member 5. The valve body 2 is slidably guided in a valve insert 9, which is in turn located in the valve recess 3 and which comprises an annular valve seat 10. As the valve body 2 is used to influence a free flow cross-section through a flow passage 11 edged by the valve seat 10, a continuous annular sealing washer 12 is provided between the valve member 5 and the actuator 6; in the neutral position according to FIG. 1, this is designed for a sealing contact with the valve seat 10, thereby blocking the flow passage 11. Both the valve member 5 and the actuator 6 are in the illustrated embodiment sealed against the valve insert 9 by a lip sealing ring 15, 16 each and therefore bound a pressure chamber 17 together with the valve insert 9 and the valve housing 4. The pressure chamber 17 is connected for fluidic communication to a first supply passage not shown in detail via a first recess 18. Via a second recess 19, the pressure chamber 17 is connected for fluidic communication to an outlet passage which is likewise not shown in detail. By the interaction between the valve member 5 and the valve seat 10, a fluidically communicating connection can be established or blocked as required between the first recess 3 and the second recess 19 along the flow passage 11.

In the end region remote from the actuator 6, the valve member 5 is assigned a compression spring 20 which in the illustrated neutral position of the valve module 1 causes a blocking of the flow passage 11. To open the flow passage 11, a translational relative movement of the valve member 5 and the actuator 6 coupled thereto along the central axis 21 of the valve module 1 is required. In this process, the restoring force of the compression spring 20 has to be overcome. For this purpose, the actuator 6 is accommodated in a pilot chamber 23 defined by the valve insert 9 and an end plate 22. In the end plate 22, an operating passage 24 is formed through which fluid can be supplied to and discharged from the pilot chamber 23. For an advantageous seal between the pressure chamber 17 and the pilot chamber 23, a sealing membrane 25 is installed between the valve insert 9 and the end plate 22. When pressure is now applied to the pilot chamber 23, the actuator 6 and the valve member 5 coupled thereto are displaced, whereby the sealing washer 12 is lifted off the valve seat 10 and the flow passage 11 through the pressure chamber 17 is opened. The pressurised fluid required for this purpose is for example provided to the operating port 24 of the valve module 1 by a pilot valve not shown in the drawing.

In the illustrated embodiment, the end plate 22 is at least substantially rotationally symmetric relative to the central axis 21 and comprises a connector 27 through which an operating passage 28 passes. The operating passage 28 is designed for a fluidically communicating connection between the pilot chamber 23 and the operating port 24 and is in the illustrated embodiment a straight bore with a cylindrical cross-section. A continuous supporting ring 29 which, together with the end plate 22, defines an annular groove in which the coil arrangement 30 is accommodated is mounted on the connector 27. The connector 27 forms the winding core for coil windings 31 of the coil arrangement 30, which in turn is a part of a sensor device 26.

The coil windings 31 are formed by winding an insulated piece of wire onto the connector 27. Diagrammatically illustrated wire ends 32, 33 of the coil arrangement 30 are connected to an AC source 34 and to a current metering device 35 series-connected to the AC source 34; these components are likewise a part of the sensor device 26.

Figure 2:
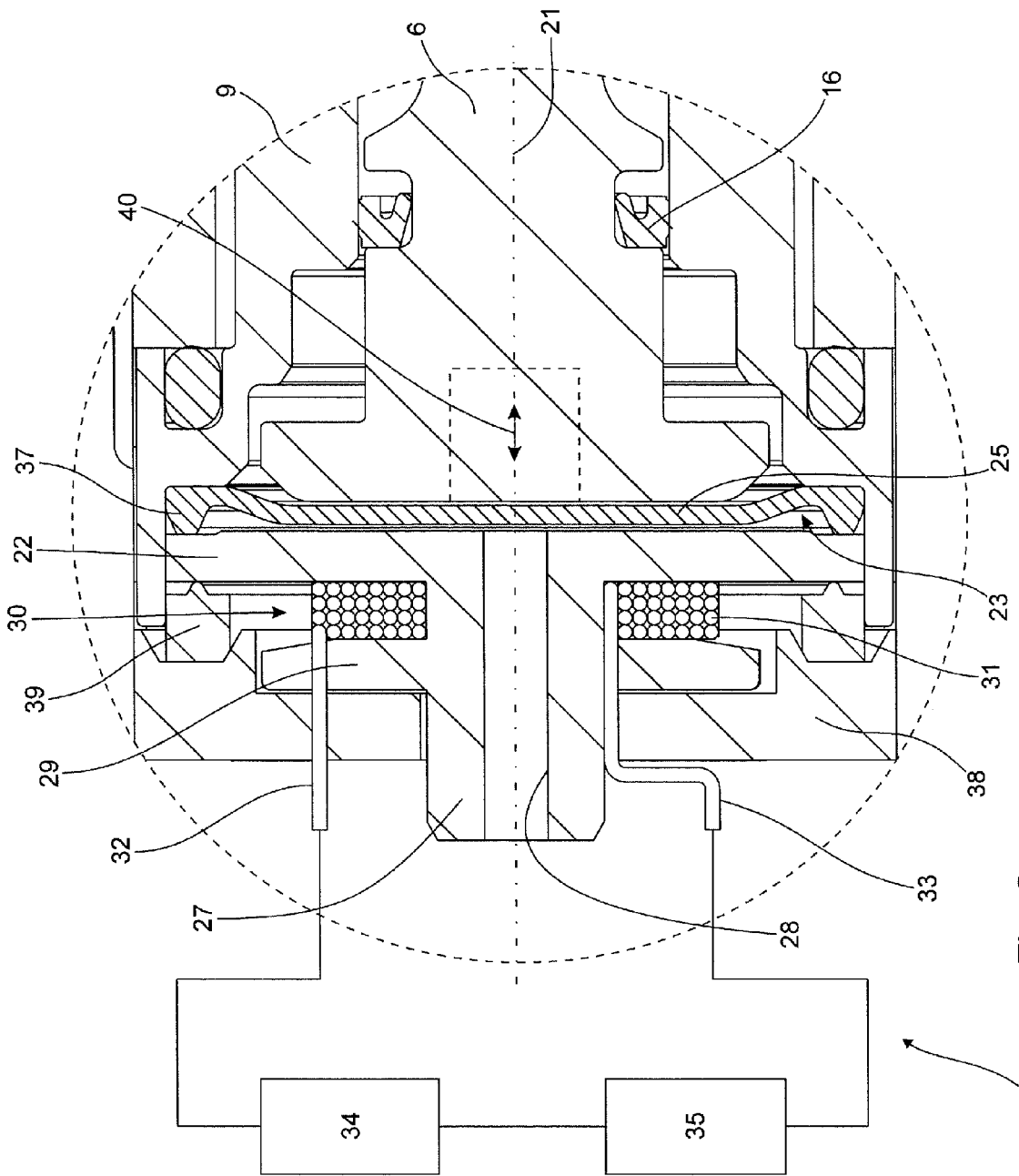
FIG. 2 is a detailed representation of a section from FIG. 1.

The AC source 34 is designed for providing a high-frequency AC current for the coil arrangement 30 in order to cause eddy currents in the valve member 5 and/or in the actuator 6, provided these are made of a metallic material. If neither the valve member 5 nor the actuator 6 is made of a metallic material, a metallic body can be integrated into the actuator 6 or the valve member 5, as indicated by the rectangle drawn in broken lines in FIG. 2.

The magnetic field emitted by the coil arrangement 30 if subjected to an AC current is influenced by the induced eddy currents in such a way that the influence of the eddy currents on the magnetic field of the coil arrangement 30 is stronger if the distance between the coil arrangement 30 and the valve member 5 and actuator 6 is shorter than at a longer axial distance along the central axis 21 between the coil arrangement 30 and the valve member 5 and actuator 6.

If the influence of the eddy currents is weaker, a change in time of the coil magnetic field as modulated by the AC source 34 is decelerated less, so that a higher coil current can flow and is detected by the current metering device 35. The current metering device 35 can therefore provide a measuring signal which is dependent on the axial distance between the coil arrangement 30 and the valve member 5 and actuator 6, which is converted into an analogue or digital distance signal in an evaluation device 36 and which can be made available to an open- or closed-loop valve controller not shown in detail.

The placing of the coil arrangement 30 concentric with the connector 27 allows for a small axial distance between the coil arrangement 30 and the valve member 5 as well as the actuator 6. The connector 27 further serves as a winding core and stabilises the coil arrangement 30. Furthermore, the free internal diameter of the coil arrangement 30, which has to be provided in any case, is used as an opening for the operating passage 28, resulting in a particularly compact construction for the valve module 1 with its integrated coil arrangement 30.

The sealing membrane 25, which is provided for separating the operating fluid in the pilot chamber 23 from the process fluid flowing through the pressure chamber 17, is contained between an end face region of the valve insert 9 and an opposite end face of the end plate 22. For an advantageous sealing action of the sealing membrane 25 against the associated end faces of the valve insert 9 and the end plate 22, a continuous bead 37 is provided on the sealing membrane 25, which bead 37, after the mounting of the end plate 22 on the valve housing 4, ensures a strong surface pressure in an annular region and therefore an advantageous sealing action for the sealing membrane 25. The surface pressure of the bead 37 is provided by the end plate 22, which is in turn held by a cover plate 38 mounted at the end face of the valve insert 9, in particular using adhesive force. With an inner surface facing the end plate 22, the cover plate 38 compresses a sealing ring 39, which in turn bears against a surface of the end plate 22 which faces the cover plate 38. The wire ends 32, 33 of the coil arrangement 30 pass through the cover plate 38. As the coil arrangement 30 is not placed in a pressurised region, there is no need for sealing the bushings for the cable ends 32, 33. The sealing membrane 25 is designed such that it is deformed only elastically within the valve stroke, which is substantially determined by the geometry of the valve member 5 and the valve insert 9.

The invention claimed is:

1. A valve module for influencing a fluid supply of a fluid-operated load, comprising a valve housing which defines a valve chamber with a fluidically communicating connection to an inlet port and an outlet port and a pilot chamber with a fluidically communicating connection to an operating port, and further comprising a valve member which is movably accommodated in the valve chamber and which is adjustable between a blocking position and a release position in order to influence a free flow cross-section between the inlet port and the outlet port, and further comprising an actuator which is movably accommodated in the pilot chamber and motion-coupled to the valve member, so that a position of the actuator and the valve member coupled thereto can be set as a function of a pressure applied to the pilot chamber, and further comprising a sensor device for detecting a position of the valve member and/or the actuator along a movement axis, wherein the sensor device comprises an electric coil arrangement which forms a ring around at least one fluid port from the group comprising the operating port, the inlet port and the outlet port.

2. A valve module according to claim 1, wherein a winding axis of the coil arrangement and the movement axis of the valve member and/or of the actuator are oriented at least substantially parallel to one another.

3. A valve module according to claim 2, wherein the winding axis of the coil arrangement and the movement axis of the valve member and/or of the actuator are oriented concentric with one another.

4. A valve module according to claim 1, wherein a winding axis of the coil arrangement and an extension axis of the fluid port are oriented at least substantially parallel to one another.

5. A valve module according to claim 4, wherein the winding axis of the coil arrangement and the extension axis of the fluid port are oriented concentric with one another.

6. A valve module according to claim 1 wherein the valve member and/or the actuator comprise(s) at least one electrically conducting region.

7. A valve module according to claim 1, wherein the sensor device comprises an AC source for the provision of a high-frequency AC voltage for the coil arrangement and an impedance measuring device for determining the impedance of the coil arrangement.

8. A valve module according to claim 1, wherein the coil arrangement is located on an end part which, together with the valve housing, bounds the pilot chamber and which comprises a fluid passage which is designed as an operating port for a fluidic supply of the pilot chamber.

9. A valve module according to claim 8, wherein a sealing membrane accommodated in the pilot chamber and reliably separating the fluid flow through the valve chamber from the fluid flow into the pilot chamber is located between the end part and the actuator.

* * * * *